United States Patent [19]

Sugiura et al.

[11] Patent Number: 4,706,258
[45] Date of Patent: Nov. 10, 1987

[54] SCRAP MELTING METHOD

[75] Inventors: Saburo Sugiura; Kenji Kanada, both of Aichi; Noboru Demukai, Gifu; Tetsuo Okamoto, Aichi, all of Japan

[73] Assignee: Daido Tokushuko Kabushiki Kaisha, Aichi, Japan

[21] Appl. No.: 904,591

[22] Filed: Sep. 8, 1986

[30] Foreign Application Priority Data

Sep. 10, 1985 [JP] Japan .................... 60-200229

[51] Int. Cl.⁴ .............................................. H05B 7/18
[52] U.S. Cl. ...................................................... 373/2
[58] Field of Search ................... 373/2, 78, 79, 80, 1

[56] References Cited

U.S. PATENT DOCUMENTS

| 1,626,263 | 4/1927 | Brooke | 373/78 |
| 3,379,815 | 4/1968 | Parker | 373/78 |
| 3,612,739 | 10/1971 | Korneff | 373/78 |
| 3,612,740 | 10/1971 | Katowice et al. | 373/78 |
| 3,812,275 | 5/1974 | Schempp et al. | 373/2 |
| 4,485,476 | 11/1984 | Nishimaki et al. | 373/2 |

FOREIGN PATENT DOCUMENTS 12563 4/1976 Japan ...................... 373/80

Primary Examiner—Roy N. Envall, Jr.
Attorney, Agent, or Firm—Armstrong, Nikaido, Marmelstein & Kubovcik

[57] ABSTRACT

An improvement to a scrap melting method employing an electric arc furnace, which comprises the step of heating the scrap by a powdered coal burner prior to the step of heating the scrap by the electric arc. The burning conditions are controlled so as to reduce the amount of oxidized Fe as well as the amount of $NO_x$ contained in the exhaust gases. In preferred embodiments, a pair of furnaces are employed to heat the scrap alternately by the powdered coal burner and by the electric arc.

6 Claims, 5 Drawing Figures

SCRAP MELTING METHOD

BACKGROUND OF THE INVENTION

1. Field of the Invention

The present invention relates to an improvement in a scrap melting method, and provides a method capable of melting scrap with reduced consumption of energy.

The above term "scrap" refers not only to iron scrap but also to all other materials containing iron that are used as materials for manufacturing steel together with iron scrap. Therefore, the term also includes such iron-containing materials as solid pig iron, pellet, sponge iron and reduced iron.

1. State of the Art

When manufacturing special steel using an electric arc furnace, scrap is usually melted beforehand in the arc furnace with electricity. It is not advantageous, in terms of cost reduction, to consume expensive electric power as the energy source throughout the procedure of scrap melting. Therefore, it is desired that the energy required to heat the scrap for melting should be supplied by fuel, a cheaper energy source, as a substitute for electric power.

Tests have been carried out heating the scrap with both an electric arc and, for instance, a powdered coal burner simultaneously. By thus substituting part of the scrap melting procedure, and part of the energy supply required therefor, the efficiency with respect to energy consumption can be improved. However, since the energy load (i.e. the maximum quantity of energy which can be introduced into unit volume of the furnace, and per unit time) has a limit, the consumption of electric power cannot be reduced to the desired extent. Further, $CO_2$ produced by the burning reacts with the graphite electrodes to cause carbon solution, which results in an inferior unit consumption of electrodes.

Since the flame temperature of the powdered coal burner is about 2000° C., while that of the graphite arc heater is about 3000° C., it is considered rational to use the burner and the arc heater in a switching manner wherein the former is used in the lower temperature region while the latter is used in the higher temperature region. In order to increase the proportion of fuel substitution for electric power within the total energy supply required for scrap melting, it is desirable to use the burner to as high a temperature region as possible. However, if the burner is used on the scrap in a temperature region exceeding 1000° C., rapid oxidation of iron takes place, which decreases the yield with respect to the used material.

The present inventors have long been studying methods to substitute powdered coal burner heating for electric arc heating in the first half of the scrap melting procedure, and have already proposed a scrap melting method, as disclosed in Japanese Patent Disclosure No. 59-215427, wherein such substitution can be achieved with high heating efficiency and with a controlled amount of oxidized iron. The proposed method comprises burning the powdered coal mixed with air while the scrap temperature is low, and burning the powdered coal mixed with oxygen or oxygen-enriched air instead of air when the scrap temperature increases above a certain temperature, more specifically, above about 500° C., thereby increasing the flame temperature of the burner, and thus increasing the proportion of the energy substitution.

According to a preferred embodiment of the above proposed method, a pair of furnaces are employed, to alternately heat the scrap with a burner, and melt the scrap.

SUMMARY OF THE INVENTION

The object of the present invention is to provide an improvement to the above-described scrap melting method which comprises the step of heating the scrap by a powdered coal burner prior to the step of heating the scrap by an electric arc furnace so as to melt the scrap, the improvement relating to an increase in heating efficiency and an improved control of Fe oxidation.

The present invention provides a scrap melting method employing an electric arc furnace, which comprises the step of heating the scrap by a powdered coal burner prior to the step of heating the scrap by the electric arc so as to melt the scrap; wherein the scrap is heated by the powdered coal burner until the average temperature of the scrap reaches a predetermined temperature of not higher than 1200° C., while not less than 70% of the oxygen required to burn the powdered coal is supplied from air, and the burning conditions are controlled so as to obtain a chemical composition of the exhaust gases such that $CO/(CO+CO_2+N_2) \leq 10\%$ stands.

DRAWING

The invention of the instant application will be more fully understood from the following description taken with the appended drawings, in which FIG. 1 is a block diagram showing the steps employed in carrying out the preferred embodiment of the invention;

DETAILED EXPLANATION OF PREFERRED EMBODIMENTS

Figure 1:
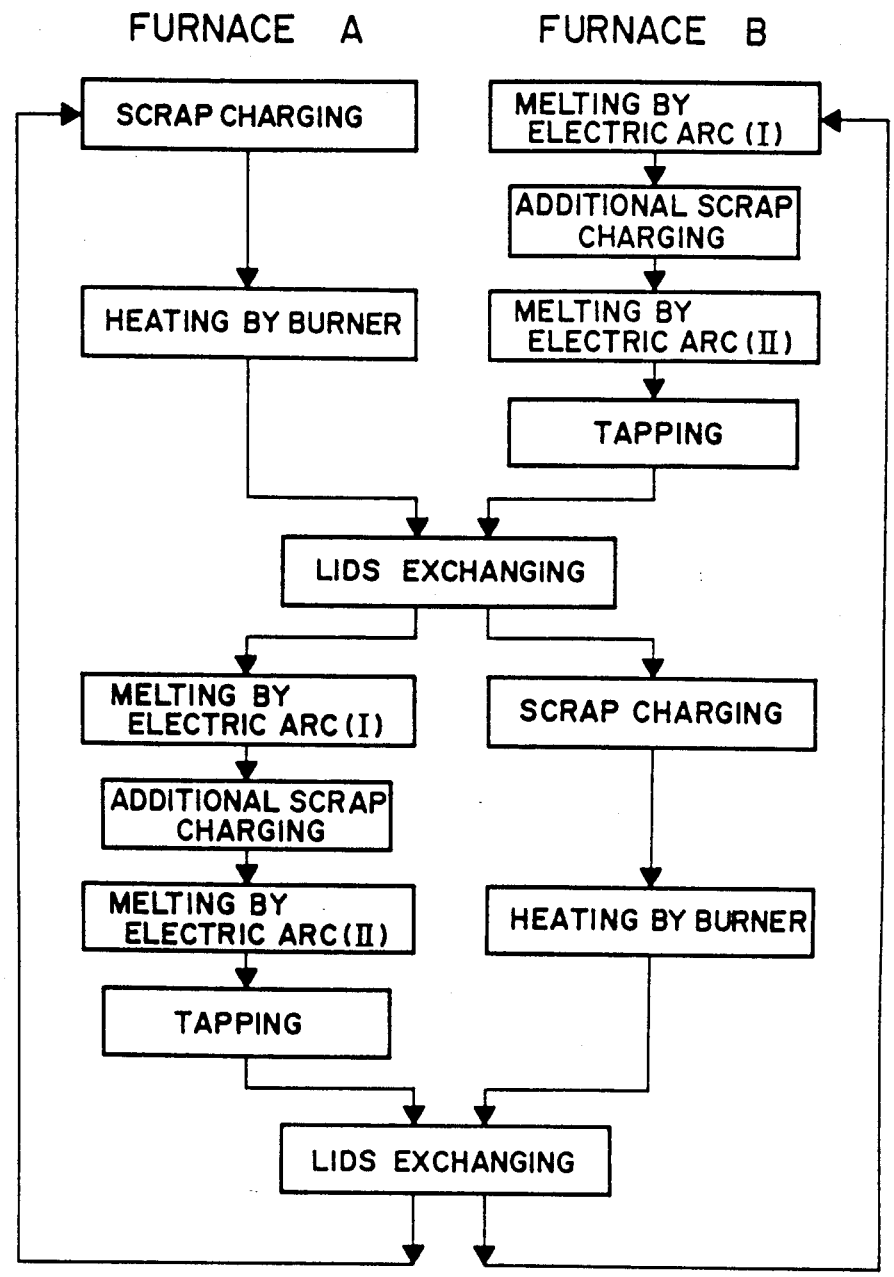

The scrap melting method proposed by the invention may be carried out by employing a pair of furnaces as in the previously proposed method. More specifically, as shown in FIG. 1, one of the furnaces is charged with a mass of scrap which is heated by at least one powdered coal burner, and when the average temperature of the scrap reaches a predetermined temperature of not more than 1200° C., the scrap is then heated by electric arc instead of the burner. While the heating of the scrap by the arc electrodes is going on in the first furnace, the other furnace is charged with another mass of scrap which is then heated by a powdered coal burner. When the scrap in the first furnace has been melted, the molten scrap is tapped out, and the furnace is charged with another batch of scrap to be heated by the powdered coal burner. Meanwhile, in the second furnace, the scrap therein is being heated by electric arc upon the average temperature of the scrap reaching the predetermined temperature. In this way, the scrap is being heated by flame of the burner and by the electric arc alternately and repeatedly.

If the pair of furnaces each comprises a furnace body, from which the furnace lid is disengageable, the facility can be effectively used by alternately applying a furnace lid provided with a powdered coal burner and a furnace lid provided with arc electrodes to the furnace bodies.

If the pair of furnaces consist of conventional electric arc furnaces each provided with arc electrodes, a furnace lid, and an electric power supply transformer, it is appropriate to prepare a furnace lid provided with a powdered coal burner which can be alternately applied to the furnaces.

In either case, the powdered coal burner heating should be carried out by using furnaces each provided with at least one powdered coal burner, and at least one exhaust gas outlet port formed in the lateral wall of the furnace at the lowest possible position above the sill level of the lateral wall. This location of the outlet port will ensure enough space for the burning as well as sufficient heat exchange within the furnace by allowing gas at high temperature to pass through long passages and gaps within the scrap mass. Preferably, a plurality of exhaust gas outlet ports should be formed in the lateral walls of the furnace at positions symmetrical with respect to the center of the furnace.

FIGS. 2 to 5 illustrate a scrap melting apparatus for carrying out the method of the instant invention.

Figure 2:
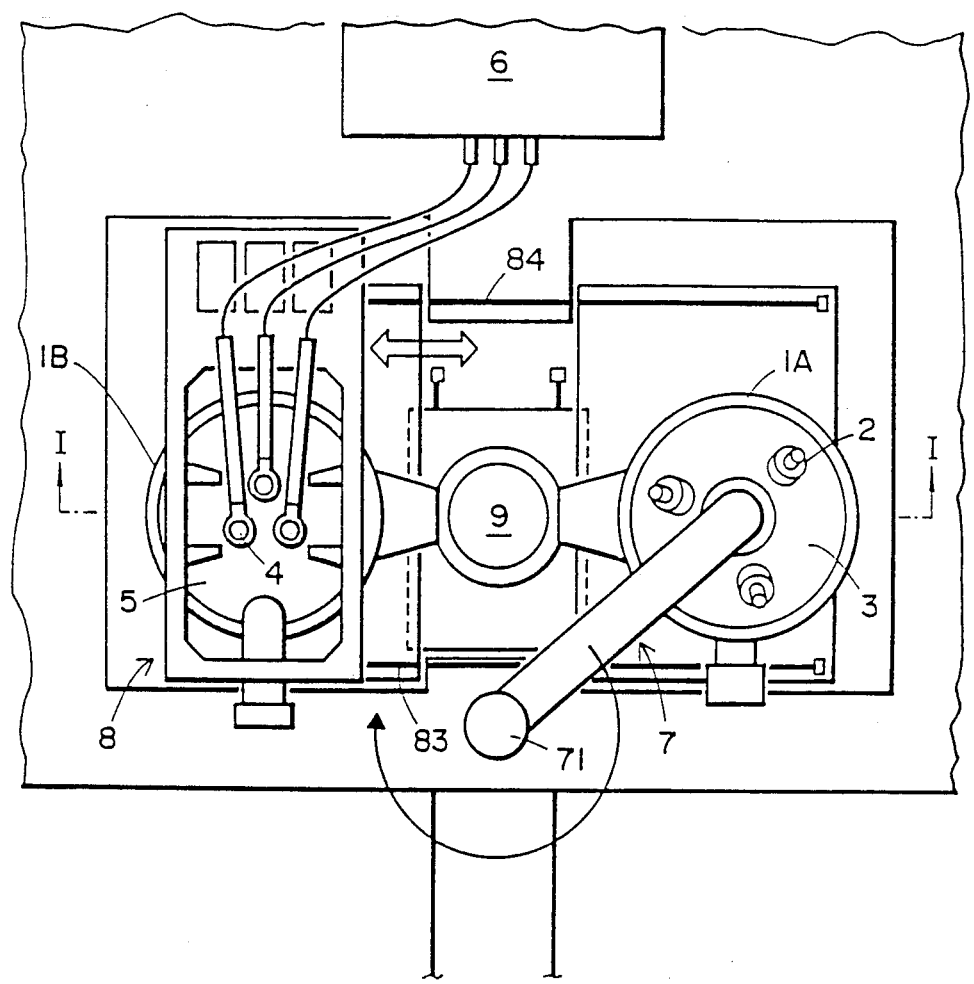
FIG. 2 is a top plan view of apparatus for carrying out the steps of FIG. 1.
Figure 3:
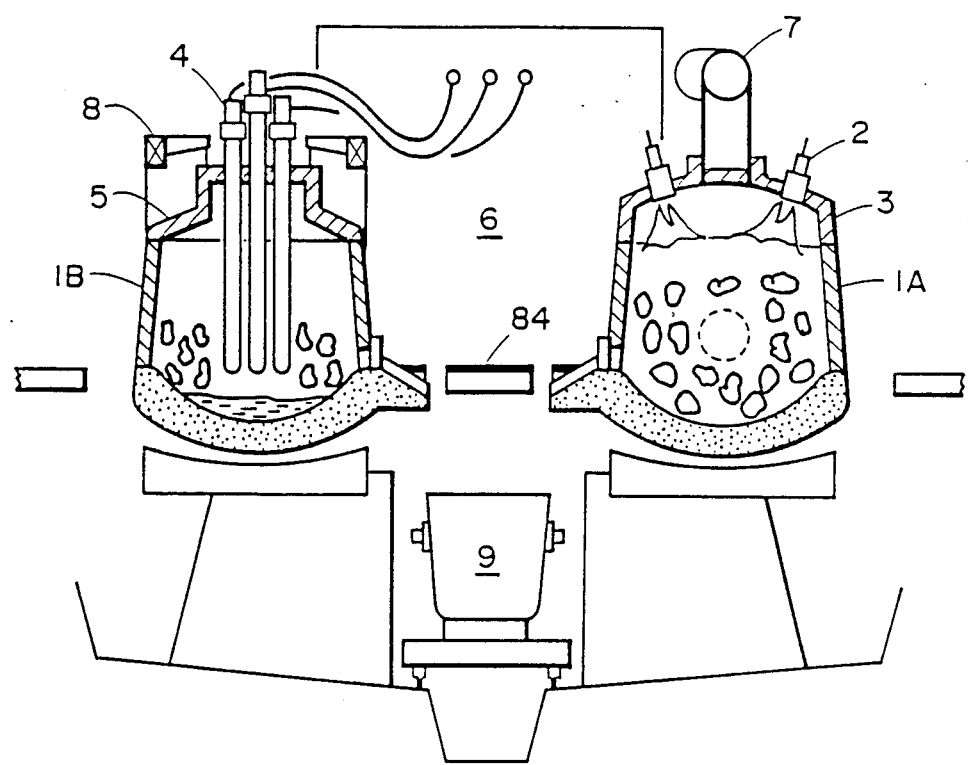
FIG. 3 is a side view, partly in section, of the apparatus of FIG. 2 taken at I—I, FIG. 2.

As shown in FIGS. 2 and 3, the apparatus comprises twin furnace bodies 1A and 1B, powdered coal heating burners 2 and a furnace lid 3 on which the burners are installed (hereinafter referred to as "burner lid"), electric poles 4 for arc heating and a furnace lid 5 having apertures for the poles (hereinafter referred to as "pole lid"), and an electric power transformer 6.

Figure 4:
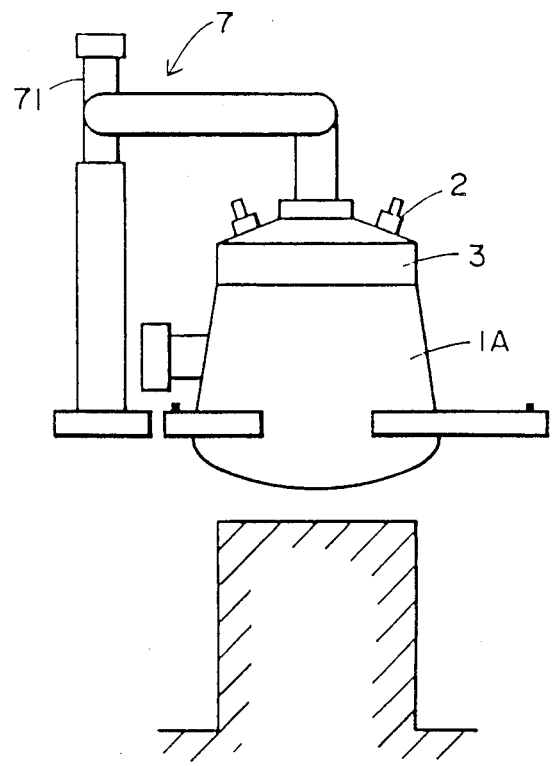
FIG. 4 is an end view of the apparatus of FIGS. 2 and 3, taken from the right hand end of the FIGS.

In order to exchangeably use the burner lid 3 and the pole lid 5 between the twin furnace bodies 1A and 1B, the burner lid 3 is, as shown in FIG. 4, provided with a moving means 7 so that it may go and return between the furnace bodies by turning around a support 71. The pole lid 5 is, as shown in FIG. 5, provided with a moving means 8 so that it also may go and return between the furnace bodies by shuttling.

The moving means 7 for the burner lid 3 shown in FIG. 4 is a swivel crane having a elevating cantilever 72 which turns around the support 71.

Figure 5:
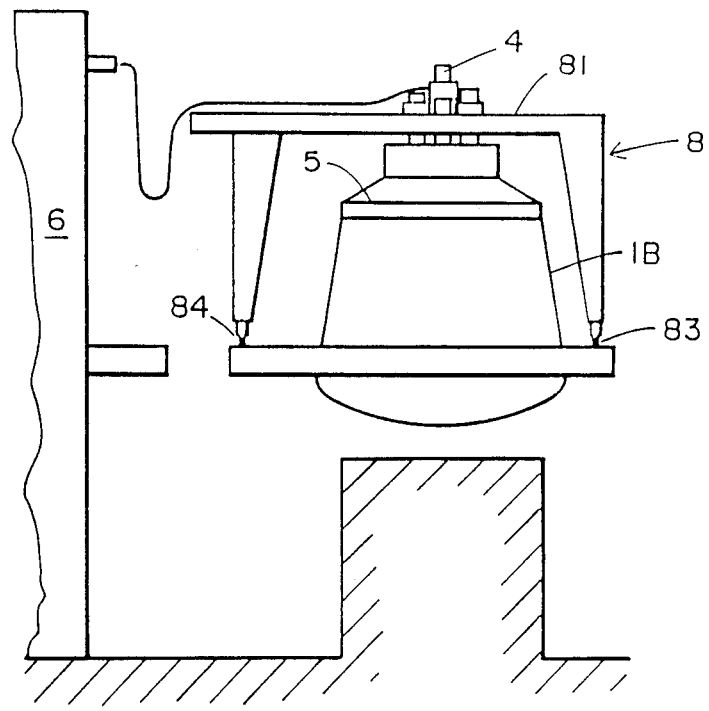
FIG. 5 is an end view, similar to FIG. 4 but taken from the left hand end of the FIGS.

A preferable type of moving means 8 for the pole lid 7 shown in FIG. 5 is a gate-type travelling crane.

The electric power transformer 6 is located preferably on a place of equal distance from the twin furnace bodies. The support 71 of the moving means for the burner lid is necessarily on a place of equal distance from the furnace bodies at the opposite side of the transformer so as to avoid conflict with electric power cables.

Tapping of the melted scrap is conveniently carried out by tilting the furnace bodies. With the layout shown in FIG. 2 the tapping spouts of the twin furnace bodies are placed face to face so that one ladle 9 may receive the melted scrap from either of the furnace bodies.

As mentioned above in relation to the previously proposed method, the powdered coal burner heating is carried out in such a manner that the scrap is burnt by supplying air until the average temperature of the scrap reaches about 500° C., and by supplying oxygen-enriched air in the high temperature region above 500° C. According to various experiments by the present inventors, though the use of pure oxygen in this step is advantageous in stabilizing the burning, it causes such problems as local heating and local oxidation of the scrap due to an excessively high flame temperature or excessively high directivity, and formation of $NO_x$ compounds, in addition to the problem of cost. As a result of the experiments, the present inventors have found that even in the high temperature region, it is appropriate to use oxygen-enriched air to such an extent that not less than 70% of the oxygen required to burn the powdered coal is supplied from air.

Further, as mentioned above, since rapid oxidation of Fe takes place in the temperature region exceeding 1000° C., a scrap temperature of 1200° C. is the virtual upper limit to which scrap can be heated by the burner. In order to reduce the amount of oxidized Fe, and to restrain the formation of $NO_x$, the conditions of burning should be controlled such that the atmospheric gas does not oxidize to an excessive extent. In contrast to the ordinary burning conditions under which a slightly excessive amount of oxygen is supplied so as to improve burning efficiency, the present inventors have found that heating the scrap by the burner should be carried out under such conditions that the CO content in the chemical composition of the exhaust gases satisfies the equation $$CO/(CO+CO_2+N_2) \leq 10\%.$$

Under typical conditions a CO content is about 5%. A CO content in excess of 10% may cause an explosion of the exhaust gases when air is mixed therewith, and also is not advantageous in respect of heat efficiency.

The use of a pair of furnaces, such as shown in FIGS. 2-5, is advantageous in respect to reduction of facility cost and operation cost, as compared to the use of a conventional UHP electric arc furnace in which heating by a powdered coal burner is carried out, if the special steel production amount (e.g. 71 kg tonn. per day) is the same. A comparison example is shown below:

| | Facility Cost Index | Operation Cost Index |
| --- | --- | --- |
| A UHP Electric Arc Furnace with a Capacity of 130 Tonn. | 1.0 | 1.0 |
| A Pair of Electric Arc Furnaces Each with a Capacity of 70 Tonn, A Burner, and an Electric Power Supply | 0.8 | 0.6 |

Further, since the production amount of special steel per lot is in general small, (though this depends on the kind of special steel to be manufactured and the situation of demand) furnaces with smaller capacities are suitable for special steel manufacture.

Since the exhaust gases produced by burner heating and electric arc heating have a high temperature, it is advantageous to apply the sensible heat of the exhaust gases to preheat the scrap which is to be charged in the furnaces. The exhaust gases from burner heating contain, as mentioned above, CO in an amount in the order of 5%. The temperature of such exhaust gases can be further increased by a secondary burning of the exhaust gases with air or oxygen-enriched air being supplied. If 30 kg of powdered coal is used per charge tonnage, the exhaust gases from the burner heating will have a sensible heat and a latent heat the sum of which amounts to 25 MCal. which corresponds to electric power of 260 kWH per charge tonnage. Incidentally, exhaust gases at high temperature may also be used in the factory boilers, besides preheating the cold scrap.

If the powdered coal to be supplied to the burner contains a large amount of sulfur, the exhaust gas from the burner may contain $SO_x$ which should be eliminated. To this end, as has been already proposed by the present inventors and disclosed in Japanese Patent Disclosure No. 60-178278, it is recommended to supply the burner with a mixture of powdered coal and $CaCO_3$ in an amount of 20% by weight of the above powdered coal, thereby fixing the $SO_x$ in the form of $CaSO_4$, thus effectively making the exhaust gases harmless.

EXAMPLE

Iron scrap was melted by using a pair of electric arc furnaces (A and B) each with a capacity of 70 ton. in an operation pattern as shown in the figure by heating the scrap with a powdered coal burner and arc electrodes alternately, with furnace lids being exchanged. The scrap which was to be charged had been preheated to an average temperature of 400° C. by a preheating device (SPH) using the exhaust gases produced by the burner heating and the arc electrode heating.

The powdered coal burner was operated in such a manner that 80 kg/min. of powdered coal was burnt with air until the average temperature of the scrap reached about 500° C., and then with a supply of oxygen-enriched air which had a ratio (in volume) of air: pure oxygen of 10:90.

With respect to the atmospheric gas which was used in the burner heating, the rate of supply of oxygen-enriched air was controlled such that the CO content in the exhaust gases would be about 5%.

When the average temperature of the scrap which was heated by the burner increased to higher than 1000° C., heating was switched from the burners to the arc electrodes. The oxidized amount of Fe was 30 kg per charge tonnage. Further, the amount of $NO_x$ contained in the exhaust gases was not more than 50 ppm.

The arc electrodes had an electric power consumption of 5000 kWH/tonn. min., and had a thermal efficiency of about 80%.

The overall consumption amounts per tonnage of the scrap melted in accordance with this example were as follows:

| | |
|---|---|
| Electric Power | 250 KWH |
| Electrodes | 2 kg |
| Carburization Material in the First Charge | 10 kg |
| Powdered Coal | 30 kg |
| $O_2$ | 20 $Nm^3$ |

For the purpose of comparison, further scrap melting was conducted in the same manner as above except that, in the burner heating, pure oxygen was supplied to the burner while the scrap was heated from an average temperature of 500° C. to 1000° C., under such a burning condition that the exhaust gases contained substantially no CO. In this case, the oxidized amount of Fe in the scrap exceeded 70 kg per charge tonnage, and further, the amount of $No_x$ in the exhaust gases was as high as 600 ppm.

What is claimed is:

1. A scrap melting method employing an electric arc furnace, which comprises:
   (a) heating said scrap by a powdered coal burner, under conditions wherein said scrap is heated by said powdered coal burner until the average temperature of said scrap reaches a predetermined temperature of not higher than 1200° C., while not less than 70% of the oxygen required to burn said powdered coal is supplied from air, and wherein the chemical composition of the exhaust gases meets the following formula $CO/CO+CO_2+N_2)<10\%$,
   followed by;
   (b) heating said scrap by said electric arc so as to melt said scrap.

2. A method according to claim 1, wherein a pair of electric arc furnaces are employed, one of which furnaces is charged with a first mass of scrap to heat said scrap therein by said powdered coal burner, and when the average temperature of said scrap reaches a predetermined temperature of not higher than 1200° C., said scrap is then heated by electric arc instead of said burner, while the other furnace is charged with a second mass of scrap which is then heated in the other furnace by a powdered coal burner, and when said first mass of scrap in the first furnace has been melted, the molten scrap is tapped out of the first furnace, and the first furnace is charged with a third mass of scrap to heat said scrap by said powdered coal burner while the other furnace heats said second mass of scrap therein by the electric arc upon the average temperature of said scrap reaching said predetermined temperature.

3. A method according to claim 1 or claim 2, wherein a furnace lid provided with a powdered coal burner means and a furnace lid provided with arc electrodes are alternately applied to the furnace bodies of said pair of furnaces.

4. A method according to claim 1 or claim 2, wherein each of said furnaces employed in the step of heating by said powdered coal is a furnace which is provided with at least one powdered coal burner at the ceiling thereof, and which has at least one exhaust gas outlet port formed in the lateral walls thereof at the lowest possible positions above the sill level of said lateral walls, and preferably has a plurality of exhaust gas outlet ports positioned symmetrically with respect to the center of said furnace.

5. A method according to claim 1 or claim 2, further including the step of preheating said scrap in a cold state which is to be charged into said furnace, by the exhaust gases which have been produced from the heating by said powdered coal burner, and if required, which has been subjected to a secondary burning by supplying air or oxygen-enriched air, and/or by the exhaust gases which have been produced from the heating by said electric arc.

6. A method according to claim 1 or claim 2, wherein said powdered coal burner is supplied with a mixture of powdered coal and $CaCO_3$ in an amount not more than 20% by weight of said powdered coal.

* * * * *